UNITED STATES PATENT OFFICE.

KONRAD DELBRÜCK AND KURT MEISENBURG, OF ELBERFELD, GERMANY, ASSIGNORS TO SYNTHETIC PATENTS CO. INC., OF NEW YORK, N. Y., A CORPORATION OF NEW YORK.

PROCESS FOR FERMENTING SUGARS.

1,169,321. Specification of Letters Patent. Patented Jan. 25, 1916.

No Drawing. Application filed June 23, 1914. Serial No. 846,887.

*To all whom it may concern:*

Be it known that we, KONRAD DELBRÜCK and KURT MEISENBURG, doctors of philosophy, chemists, citizens of the German Empire, residing at Elberfeld, Germany, have invented new and useful Improvements in Processes for Fermenting Sugars, of which the following is a specification.

We have found a new and valuable process for fermenting sugar or materials containing sugar by means of the *Bacillus macerans*, which process consists in adding to the fermenting mass indifferent substances, presenting a large surface, such as asbestos, filtering paper, peat, peels of fruit, potatoes, etc., suitably in the presence of nitrogenous nutritive materials, such as pressed yeast, extract of yeast, acrospires, etc. By these additions the fermentation is accelerated and completed.

In order to illustrate the new process more fully the following examples are given, the parts being by weight:—

Example 1: 90 parts of cane sugar are mixed up with 60 parts of malt culms, 45 parts of chalk and 3000 parts of water. This mixture after being sterilized for 20 minutes (as by heating the mixture for this length of time at a pressure of 2-atmospheres to about 200° C.) is then inoculated with a bacilli culture of the *Bacillus macerans*. At 40° C. the fermentation begins. After 5 days the cane sugar has wholly disappeared. In the mash are contained about 30 parts of alcohol and acetone instead of the cane sugar. Without adding the malt culms the yield is only about 10 parts of alcohol and acetone, which result is obtained in 7 days.

Example 2: 200 parts of neutralized molasses (containing 90 parts of sugar) are mixed up with 20 parts of chalk, 20 parts of peat, 25 parts of yeast and 2000 parts of water. This mixture is inoculated with a bacilli culture of *Bacillus macerans* and is left standing for a 6 days' fermentation at 40° C. About 40 parts of alcohol and acetone (2.5:1) are obtained by distillation.

We claim:—

1. The new process comprising the fermenting of a sugar containing material by means of the *Bacillus macerans*, which process consists in carrying out this fermentation with the addition of an indifferent substance presenting a large surface to the fermenting mass, substantially as described.

2. The new process comprising the fermenting of a sugar containing material by means of the *Bacillus macerans*, which process consists in carrying out this fermentation with the addition of an indifferent substance presenting a large surface to the fermenting mass and at a temperature of about 40° C., substantially as described.

3. The new process comprising the fermenting of a sugar containing material by means of the *Bacillus macerans*, which process consists in carrying out this fermentation with the addition of an indifferent substance presenting a large surface and a nitrogenous nutritive material to the fermenting mass, substantially as described.

4. The new process comprising the fermenting of a sugar containing material by means of the *Bacillus macerans*, which process consists in carrying out this fermentation with the addition of an indifferent substance presenting a large surface and a nitrogenous nutritive material to the fermenting mass and at a temperature of about 40° C., substantially as described.

5. The new process comprising the fermenting of a sugar containing material by means of the *Bacillus macerans*, which process consists in carrying out this fermentation with the addition of peat to the fermenting mass, substantially as described.

6. The new process comprising the fermenting of a sugar containing material by means of the *Bacillus macerans*, which process consists in carrying out this fermentation with the addition of peat to the fermenting mass and at a temperature of about 40° C., substantially as described.

7. The new process comprising the fermenting of a sugar containing material by means of the *Bacillus macerans*, which process consists in carrying out this fermentation with the addition of peat and yeast to the fermenting mass, substantially as described.

8. The new process comprising the fermenting of a sugar containing material by means of the *Bacillus macerans*, which process consists in carrying out this fermentation with the addition of peat and yeast to the fermenting mass and at a temperature of about 40° C., substantially as described.

9. The new process comprising the fermenting of cane sugar by means of the Bacillus macerans, which process consists in carrying out this fermentation by the addition of peat to the fermenting mass, substantially as described.

10. The new process comprising the fermenting of cane sugar by means of the Bacillus macerans, which process consists in carrying out this fermentation with the addition of peat and yeast to the fermenting mass, substantially as described.

In testimony whereof we have hereunto set our hands in the presence of two subscribing witnesses.

KONRAD DELBRÜCK. [L. S.]
KURT MEISENBURG. [L. S.]

Witnesses:
 HELEN NUFER,
 FRANCES NUFER.